US012776646B2

(12) United States Patent
Grimm et al.

(10) Patent No.: US 12,776,646 B2
(45) Date of Patent: Oct. 27, 2026

(54) VOLTAGE LIMITING DEVICE FOR CONSTANT CURRENT CIRCUITS

(71) Applicant: ADB Safegae BV, Zaventem (BE)

(72) Inventors: Florian Grimm, Heidelberg (DE); Nicolas Sauvage, Woluwe-Saint-Pierre (BE); Eric De Vleeschauwer, Lochristi (BE)

(73) Assignee: ADB Safegate BV, Machelen (BE)

( * ) Notice: Subject to any disclaimer, the term of this patent is extended or adjusted under 35 U.S.C. 154(b) by 166 days.

(21) Appl. No.: 18/721,040

(22) PCT Filed: Jan. 12, 2023

(86) PCT No.: PCT/EP2023/050663
§ 371 (c)(1),
(2) Date: Jun. 17, 2024

(87) PCT Pub. No.: WO2023/135224
PCT Pub. Date: Jul. 20, 2023

(65) Prior Publication Data

US 2025/0062609 A1 Feb. 20, 2025

(30) Foreign Application Priority Data

Jan. 14, 2022 (EP) .................................... 22151680

(51) Int. Cl.
*H02H 9/04* (2006.01)
*H02H 3/02* (2006.01)

(52) U.S. Cl.
CPC ............ *H02H 9/041* (2013.01); *H02H 3/023* (2013.01); *H02H 3/025* (2013.01); *H02H 9/042* (2013.01)

(58) Field of Classification Search
CPC ........ H02H 9/041; H02H 3/023; H02H 3/025; H02H 9/042; H02H 3/202
USPC ........................................................ 361/91.1
See application file for complete search history.

(56) References Cited

U.S. PATENT DOCUMENTS 7,023,679 B2 * 4/2006 Tomiyama .......... H02M 3/3385 361/91.1
7,408,396 B1 * 8/2008 El-Khoury ............... H02H 9/04 361/88
8,537,517 B1 * 9/2013 Banak .................... H02H 9/025 361/93.1
9,407,090 B1 * 8/2016 Gill .......................... H02H 9/06
(Continued)

FOREIGN PATENT DOCUMENTS

EP 3367760 A1 8/2018
EP 3503331 A1 6/2019

*Primary Examiner* — Dharti H Patel
(74) *Attorney, Agent, or Firm* — Rankin, Hill & Clark, LLP

(57) ABSTRACT

A voltage limiting device (15) for constant current circuits (10) comprises input terminals (153) for connecting the voltage limiting device to a current supply (11) of a constant current circuit, output terminals (154) for connecting the voltage limiting device to a load, a voltage clamping circuit (151), and a switching circuit (152). The input terminals (153) are connected to the output terminals (154) under a normal operating condition. The voltage clamping circuit (151) is configured to clamp a voltage across the output terminals to a first voltage threshold and the switching circuit is configured to short-circuit the output terminals when a second voltage threshold across the output terminals is exceeded longer than a predetermined time period.

21 Claims, 3 Drawing Sheets

(56) References Cited

U.S. PATENT DOCUMENTS

| | | | | |
|---|---|---|---|---|
| 10,348,079 | B2 * | 7/2019 | Yasusaka | H02H 1/0007 |
| 10,498,138 | B2 * | 12/2019 | Jankowski | H03K 17/0822 |
| 12,483,138 | B1 * | 11/2025 | Vinciarelli | H02M 3/158 |
| 2001/0021091 | A1 * | 9/2001 | Weichler | H02H 3/202 361/91.1 |
| 2002/0166073 | A1 * | 11/2002 | Nguyen | G06F 1/26 713/300 |
| 2002/0186518 | A1 * | 12/2002 | Nishikawa | H02H 3/202 257/E29.268 |
| 2008/0192394 | A1 * | 8/2008 | Harris | H02H 9/025 361/111 |
| 2008/0266739 | A1 | 10/2008 | Migliavacca | |
| 2013/0016448 | A1 * | 1/2013 | George | H02H 7/1222 361/91.1 |
| 2013/0033197 | A1 * | 2/2013 | Hwang | H05B 45/382 315/307 |
| 2013/0063039 | A1 * | 3/2013 | Hwang | H05B 45/385 315/223 |
| 2014/0355157 | A1 * | 12/2014 | Huang | H02H 9/041 361/56 |
| 2015/0333509 | A1 * | 11/2015 | Jankowski | H02H 7/042 361/35 |
| 2017/0047734 | A1 * | 2/2017 | Jankowski | H01F 27/343 |
| 2018/0054053 | A1 * | 2/2018 | Hoekstra | H02H 3/044 |
| 2019/0215919 | A1 | 7/2019 | Fang et al. | |
| 2020/0292161 | A1 * | 9/2020 | Majewski | H05B 45/37 |
| 2021/0066909 | A1 * | 3/2021 | Ramadass | H02H 7/20 |
| 2022/0080907 | A1 * | 3/2022 | Nishikawa | H02H 1/0007 |
| 2023/0058315 | A1 * | 2/2023 | Meng | G01R 19/16576 |
| 2023/0154919 | A1 * | 5/2023 | Moeneclaey | H10D 89/911 257/355 |
| 2024/0072530 | A1 * | 2/2024 | Forejtek | H02H 3/087 |
| 2025/0062609 | A1 * | 2/2025 | Grimm | H02H 9/041 |

* cited by examiner

VOLTAGE LIMITING DEVICE FOR CONSTANT CURRENT CIRCUITS

TECHNICAL FIELD

The present disclosure is related to a voltage limiting device for limiting excessive voltages occurring in constant current circuits, such as airfield lighting systems, during faulty conditions.

BACKGROUND ART

Airfield lighting systems are generally made as a constant current circuit, i.e. the lighting devices are series connected in a current supply circuit. Both AC and DC constant current circuits exist. AC constant current circuits allow utilizing transformers. In this case, the lighting devices are connected to the secondary side of the transformer. Multiple of these transformers are connected (at their primary side) in series and are supplied with a constant current.

In a constant current circuit, in case of an open circuit fault, the voltage across the terminals can rapidly rise to high levels. To protect maintenance personnel from injury, a voltage limiter is provided to short-circuit the secondary side of the transformer and prevent the voltage at the output from rising excessively.

In known voltage limiters for constant current circuits, the voltage limiters are activated when the voltage exceeds a safety level threshold, e.g. 50 V, and need to act very fast to avoid overvoltage. They generally comprise an analogue voltage monitoring circuit, an isolated power supply and very fast switching logic, leading to high complexity and a high component count. Nevertheless, even if switching off times are very short (e.g. 50 μs), during this short time voltage spikes up to 600 V can still occur.

Additionally, voltage surges can occur when a LED light fixture is powered and its switching mode power supply has not started the operation yet, because its capacitors are not charged with enough energy. When such a voltage surge causes the voltage limiter to be activated, there is insufficient time to charge the capacitor and the same process will be repeated each half cycle of the mains current, leading to a flickering or not proper starting of the LED light.

US 2016/0262232 discloses a lighting device for the head light of a vehicle, comprising a switch mode power supply and a controller. The controller is provided with an interrupter which is repeatedly switched to maintain the output voltage of the power converter around a predetermined voltage. The controller is further provided with an abnormal state determining section configured to switch off the power converter when a voltage is applied to the light source which exceeds a voltage threshold for a predetermined time. By so doing, circuit components, such as the light source, can be protected.

US 2015/0333509 discloses a protective circuit for a current transformer for preventing a secondary voltage on a secondary circuit of the current transformer from exceeding a secondary voltage threshold. The protective circuit comprises a limiting unit, a control unit and a switch unit. The switch unit is configured to short the secondary terminals of a current transformer as soon as a voltage at an input of a comparator reaches a threshold voltage. The input voltage to the comparator is provided by a capacitor which is charged by a rectifier. The capacitor also provides the voltage to drive the transistors of the switch unit. As soon as the comparator turns on the switch unit to create a short-circuit, the capacitor at the input of the comparator is discharged until a turn-off voltage at the input of the comparator is reached. One drawback of the above circuit is that, while the capacitor at the input of the comparator is charged almost instantly, the charging time to turn on the comparator is undefined since the charging current path of the capacitor does not comprise any resistance elements. Only the discharge time of the capacitor, once the comparator is turned on, is defined. This can create an uncertainty in the time at which the comparator turns on.

SUMMARY

There is therefore a need in the art of constant current circuits to provide a voltage limiter, or a voltage surge protection device, which has a reduced complexity, is more reliable, more economical and/or allows to effectively prevent voltage surges. There is a need in the art to provide such a device which provides a more reliable protection for people operating at the output terminals of the constant current circuit against injury.

According to a first aspect of the invention, there is therefore provided a voltage limiting device as set out in the appended claims. A voltage limiting device according to aspects of the present disclosure comprises input terminals for connecting the voltage limiting device to a current supply, e.g. of a constant current circuit, output terminals for connecting the voltage limiting device to a load, such as an airfield lighting or signalling device, a voltage clamping circuit, and a switching circuit. The input terminals are connected to the output terminals under a normal operating condition. The voltage clamping circuit is configured to clamp a voltage across the output terminals to a first voltage threshold and the switching circuit is configured to short-circuit the output terminals and/or the input terminals when a second voltage threshold across the output terminals is exceeded longer than a first predetermined time period, and advantageously to maintain the short-circuit condition for a second predetermined time period and to remove the short-circuit condition (open the input and/or output terminals) when the second predetermined time period is exceeded. The second voltage threshold is advantageously smaller than or equal to the first voltage threshold. Advantageously, the first predetermined time period is between 50 ms and 2000 ms. The second predetermined time period can be between 1 s and 60 s, such as at least 5 s.

The voltage limiting device according to aspects of the present disclosure hence provides a two-tier protection of a human being from overvoltage in case of malfunction of the electric load coupled to the output terminals, or in case of maintenance operations to the electrical circuit, where the load may be disconnected. By providing a two-tier protection, defining a first, clamping voltage threshold and a second voltage threshold which triggers a time delay for short-circuiting the output, not only an optimal personal protection is provided against excessive voltage fulfilling international electrical standards, but it is also possible to avoid unwanted switch-off of the load during startup, e.g. in case of LED devices, where a capacitor is charged at startup requiring a higher voltage during a short time frame. This prevents unwanted flickering of the LED lights at startup. Hence the voltage limiting devices of the present disclosure provide an improved protection logic.

According to a second aspect of the invention, there is provided a constant current circuit or an isolation transformer, as set out in the appended claims. The constant current circuit or the isolation transformer comprise the voltage limiting device according to the first aspect.

According to a further aspect of the present disclosure, there is provided a method of limiting a voltage rise, particularly in a constant current circuit. The method comprises connecting a current supply, e.g. of a constant current circuit, to output terminals under normal operating conditions. The voltage across the output terminals can be monitored under normal operating conditions. The method further comprises clamping the voltage across the output terminals to a first voltage threshold, particularly when the voltage reaches and/or would exceed the first voltage threshold. The method further comprises short-circuiting the output terminals when the voltage across the output terminals exceeds a second voltage threshold for a first predetermined time period, and advantageously to maintain the short-circuit condition for a second predetermined time period and to remove the short-circuit condition (open the input and/or output terminals) when the second predetermined time period is exceeded. The second voltage threshold is advantageously smaller than the first voltage threshold or can be equal to it. The method of limiting the voltage rise of the present disclosure can be implemented in the voltage limiting device of the present disclosure. Advantageously, the first predetermined time period is between 50 ms and 2000 ms. The second predetermined time period can be between 1 s and 60 s, such as at least 5 s.

BRIEF DESCRIPTION OF THE FIGURES

Aspects of the invention will now be described in more detail with reference to the appended drawings, wherein same reference numerals illustrate same features and wherein.

DETAILED DESCRIPTION

Figure 1:
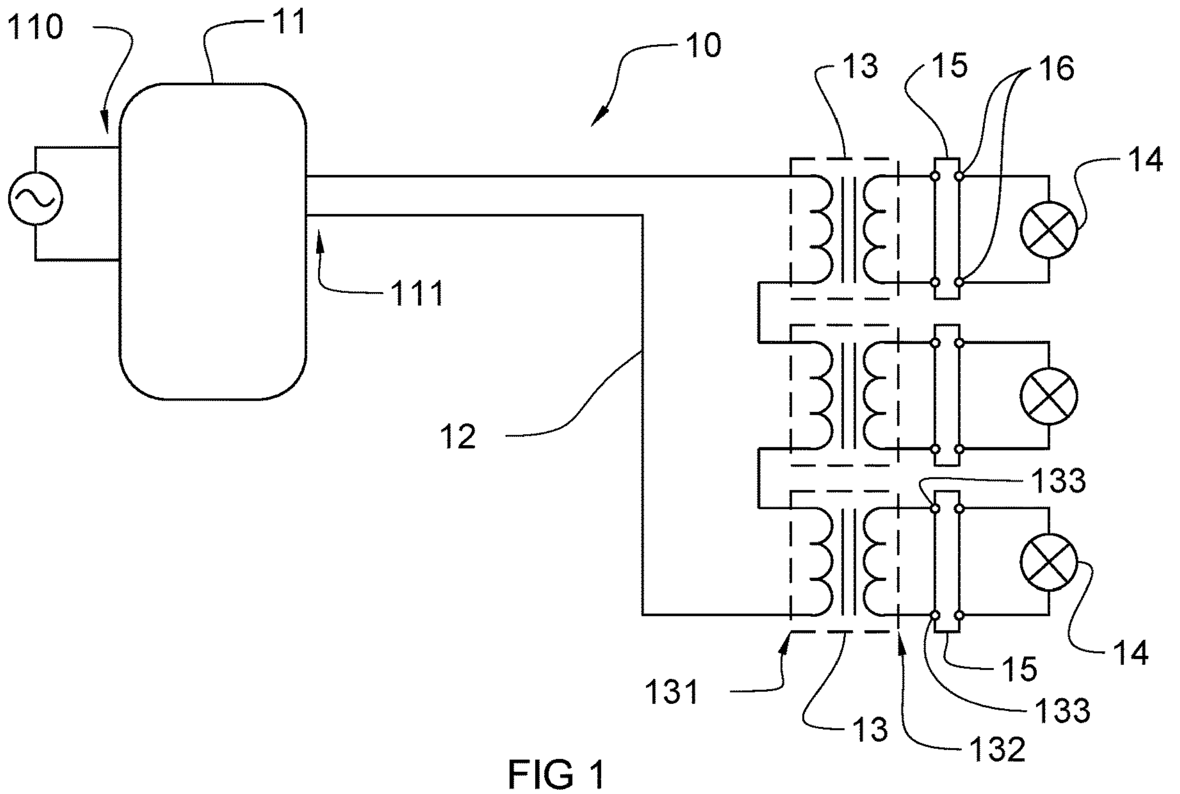
FIG. 1 represents a diagram of a constant current circuit according to aspects of the present disclosure.

Referring to FIG. 1, a constant current circuit 10, e.g. for use on an airfield, comprises constant current regulator (CCR) 11 and a power line 12. The constant current regulator 11 is configured to provide a regulated current at an output port 111. The regulated current at output port 111 can be a DC current, but is advantageously an AC current. The constant current regulator comprises a power input port 110 for connection to an electrical power supply, such as a single-phase AC or three-phase grid. Power line 12 connects output port 111 to a plurality of loads. In one particular application, the loads are signalling devices 14, which can be aeronautical ground lights or any other kind of lighting or signalling device, such as airfield runway signs.

The signalling devices 14 are connected in series through the power line 12. To this end, the constant current circuit can comprise a plurality of field transformers 13, the primary side 131 of which is connected in series to the power line 12. The secondary side 132 of the field transformer 13 is connected to one, or a plurality of signalling devices 14. Field transformers 13 can e.g. ensure galvanic isolation between the power line 12 and the signalling device 14. The signalling devices 14 are connected to output terminals 16 of the power line 12. As described, the power line 12 can comprise a plurality of series connected output terminals 16, each configured to be connected to a signalling device 14.

The constant current circuit 10 comprises a voltage limiting device 15 configured to avoid excessive voltage rise (voltage surge) in case of malfunction of the signalling device 14, or when the signalling device 14 is disconnected from the power line 12, e.g. during maintenance operations. As described above, the voltage surge is an effect peculiar to current source systems, as the constant current circuit 10 will try to maintain a flow of electric current, even in case of an open circuit fault at or beyond the output terminals 16. As a result, the voltage across the terminals will rise rapidly. The voltage limiting device 15 therefore prevents injury of maintenance personnel when they would inadvertently touch the terminals 16 or any lead connected thereto.

Voltage limiting device 15 is connected to the output terminals 16 for limiting the voltage at the output terminals 16. In particular, voltage limiting device 15 is arranged between the secondary side terminals 133 of field transformer 13 and output terminals 16. It is alternatively possible to provide the voltage limiting device 15 at the primary side of field transformer 13.

Figure 2:
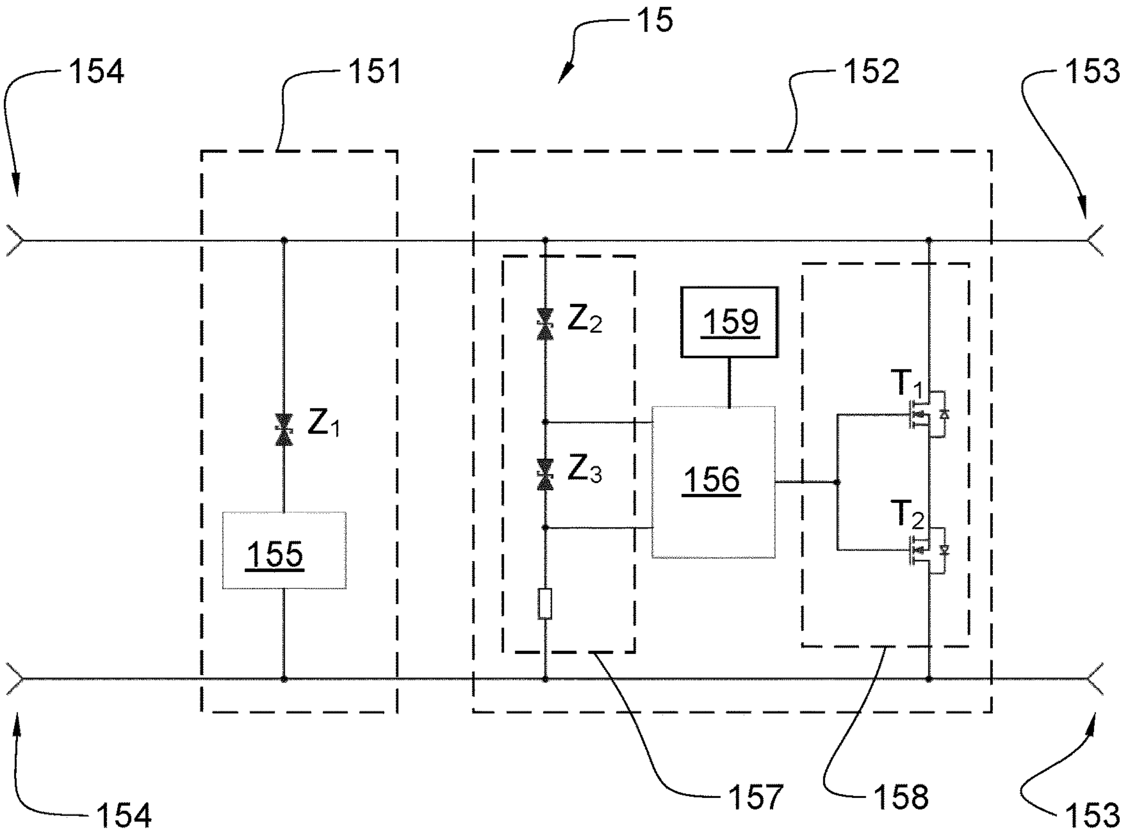
FIG. 2 represents an electrical diagram of an exemplary voltage limiting device according to aspects of the present disclosure.

Referring to FIG. 2, the voltage limiting device 15 according to the present disclosure is a two-tier protection device. Voltage limiting device 15 comprises input terminals 153 and output terminals 154. The input terminals 153 and output terminals 154 are connected to each other, e.g. equipotentially. The output terminals 154 can constitute, or be connected to, the output terminals 16 of the constant current circuit 10. A voltage clamping circuit 151 and a switching circuit 152 are arranged, preferably in parallel, between the input terminals 153 and the output terminals 154.

Figure 3:
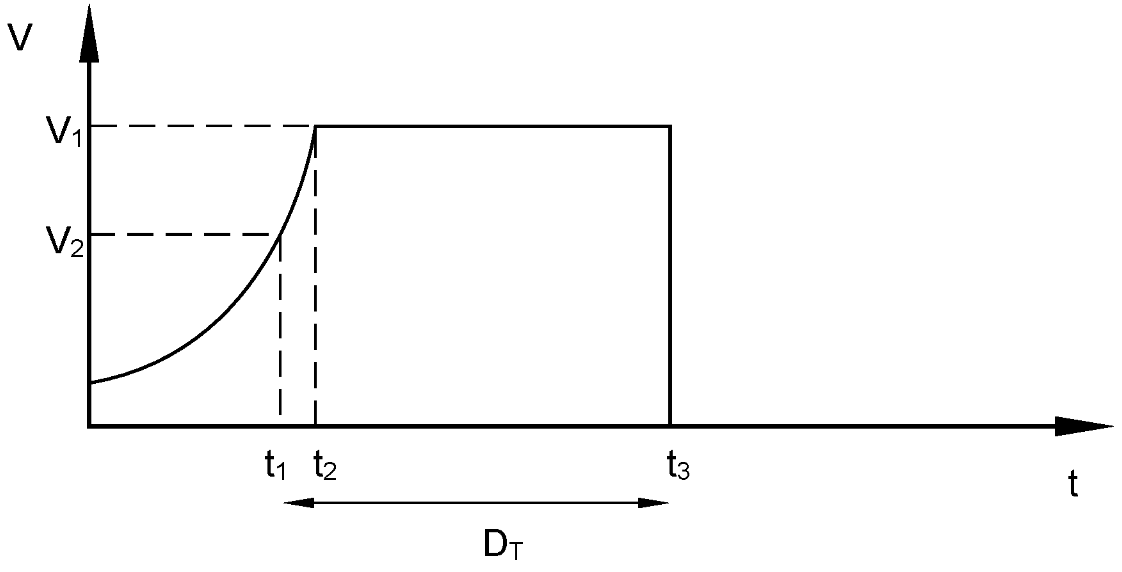
FIG. 3 represents a graph of a voltage surge at the output terminals of a constant current circuit which is limited and interrupted by the voltage protection device according to aspects of the present disclosure.

Voltage clamping circuit 151 is configured to clamp a voltage across the output terminals 154 to a first voltage threshold $V_1$ (FIG. 3). This can be obtained by a simple semiconductor device, such as a Zener diode, in particular a bipolar Zener diode $Z_1$ for AC current circuits. Alternative voltage clamping circuits can be contemplated, such as comprising a TVS (Transient Voltage Suppression) diode or a DIAC (diode alternating current switch), TRIAC (triode for alternating current) or Thyristor in series with a resistor, or a metal oxide varistor (MOV).

A monitoring circuit 155 can be provided in connection to the voltage clamping circuit 151 for testing the voltage clamping circuit 151, e.g. during maintenance. Monitoring circuit 155 is configured to monitor if a current is flowing through the limiting semiconductor devices of the voltage clamping circuit, in particular through the Zener diode $Z_1$. By way of example, monitoring circuit 155 can comprise a Hall sensor.

Switching circuit 152 is configured to short-circuit the output terminals 154 (or the input terminals 153) when a second threshold voltage $V_2$ across the output terminals 154 (or the input terminals 153) is exceeded longer than a predetermined time period $D_T$. To this end, switching circuit 152 can comprise a voltage detection circuit 157, a delay circuit 156, and a switch circuit 158. The voltage detection circuit 157 is configured to trigger the delay circuit 156 when the voltage across the terminals 154/153 exceeds the second threshold voltage $V_2$. By way of example, the voltage detection circuit can comprise a series arrangement of bipolar Zener diodes $Z_2$ and $Z_3$.

When the second threshold voltage $V_2$ is exceeded, both Zener diodes $Z_2$ and $Z_3$ will break through, thereby providing a current path to the delay circuit 156 (i.e. triggering the delay circuit). The delay circuit 156 can comprise a RC timer or and RC delay line. The delay circuit 156 is configured to trigger the switch circuit 158 a time period $D_T$ after it has been triggered by the voltage detection circuit 157. The switching circuit 152 can comprise an auxiliary power supply 159 configured to operate the switch circuit 158, particularly to control the gates of the MOSFETs $T_1$ and $T_2$. Auxiliary power supply 159 can comprise a DC/DC converter and a (high-frequency) transformer, or a current transformer operating at mains frequency (e.g. 50 Hz or 60 Hz) and can be connected between the input terminals 153 and output terminals 154.

Voltage detection circuit 157 can be configured to reset the delay circuit 156 when the voltage across terminals 154/153 has fallen below $V_2$, particularly when the voltage drops below $V_2$ before delay circuit 156 triggers the switch circuit 158, e.g. before time period $D_T$ elapses. This can be the case when e.g. the signalling devices 14 are LED circuits and the LEDs are switched on. The capacitors within the LED driver circuits are being charged during a charging time, causing a voltage across the output terminals 154 to rise. Once the capacitors are charged to their working voltage, the voltage at the output terminals 154 will drop again.

Switch circuit 158 is configured to provide a conduction path between the terminals 153 (or 154). By so doing, the output terminals 154 are short-circuited and any voltage differential across the output terminals 154 therefore disappears. Switch circuit 158 advantageously comprises a semiconductor device having bidirectional voltage blocking capability. Such a semiconductor device can be formed by anti-series connecting two discrete semiconductor switches $T_1$, $T_2$ having unidirectional voltage blocking capability, e.g. a metal oxide semiconductor field effect transistor (MOSFET), possibly with external anti-parallel diodes. Delay circuit 156 is configured to operate semiconductor switches $T_1$, $T_2$ to close the conduction path between the terminals 153. Alternatively, switch circuit 158 comprises any other suitable switch arrangement, such as a TRIAC, or a relay to provide the conduction path between the terminals 153 (or 154). With a TRIAC, auxiliary power supply 159 is advantageously not needed. It is possible to provide a plurality of switch circuits 158 in parallel for improved reliability.

Referring to FIG. 3, when the voltage V across the output terminals 154 starts rising, e.g. due to an open circuit fault at the side of the signalling device 14, it may reach the second threshold $V_2$ at time instant $t_1$. The voltage detection circuit 157 hence triggers the delay circuit 156. As the voltage V continues to rise, it will reach the first threshold $V_1$ at time instant $t_2$, which triggers the voltage clamping circuit 151, and the voltage is clamped at the first threshold $V_1$. As the high voltage condition persists, the delay circuit 156 will eventually trigger the switch circuit 158 to short-circuit the terminals at time instant $t_3=t_1+D_T$, causing the voltage V to drop. Typically, the time instant $t_2$ will occur between time instants $t_1$ and $t_3$.

The first voltage threshold $V_1$ can refer to a peak voltage to which a person may be exposed for a limited time without dangerous physiological effects occurring due to an electrical current through the body. Suitable values for the first voltage threshold $V_1$ are between 40 V and 120 V, in particular at least 50 V and/or 90 V or less, or 80 V or less. A particularly suitable value for the first voltage threshold is between 65 V and 80 V, e.g. 70 V.

The second voltage threshold $V_2$ is advantageously smaller than or equal to the first voltage threshold $V_1$, preferably smaller than $V_1$. The second voltage threshold can refer to a voltage at which generally no reaction on the exposed body occurs. Suitable values for the second voltage threshold $V_2$ are between 20 V and 80 V, in particular 75 V or less, 70 V or less, 60 V or less, or 50 V or less. A particularly suitable value for the second voltage threshold is between 20 V and 50 V, e.g. 45 V. The above voltage values can refer to RMS (root mean square, rms) voltage values or peak voltage values. By way of example, the second voltage threshold $V_2$ can be 50 Vrms or less, or it can be 71 Vpeak or less. The second voltage threshold $V_2$ can refer to a voltage having both an RMS value of 60 V or less, particularly 50 V or less and a peak value of 80 V or less, particularly 71 V or less. These voltage levels provide optimal human protection against electric shock.

The time period $D_T$ can be selected to be between 50 ms and 2 s (2000 ms), in particular at least 100 ms and/or 1500 ms or less, or 1000 ms or less. The time period $D_T$ is advantageously selected to be larger than a charging period of a capacitor of a driver circuit of signalling device 14 and/or shorter than the allowed exposure to a human body as a function of the second voltage threshold $V_2$.

Figure 4:
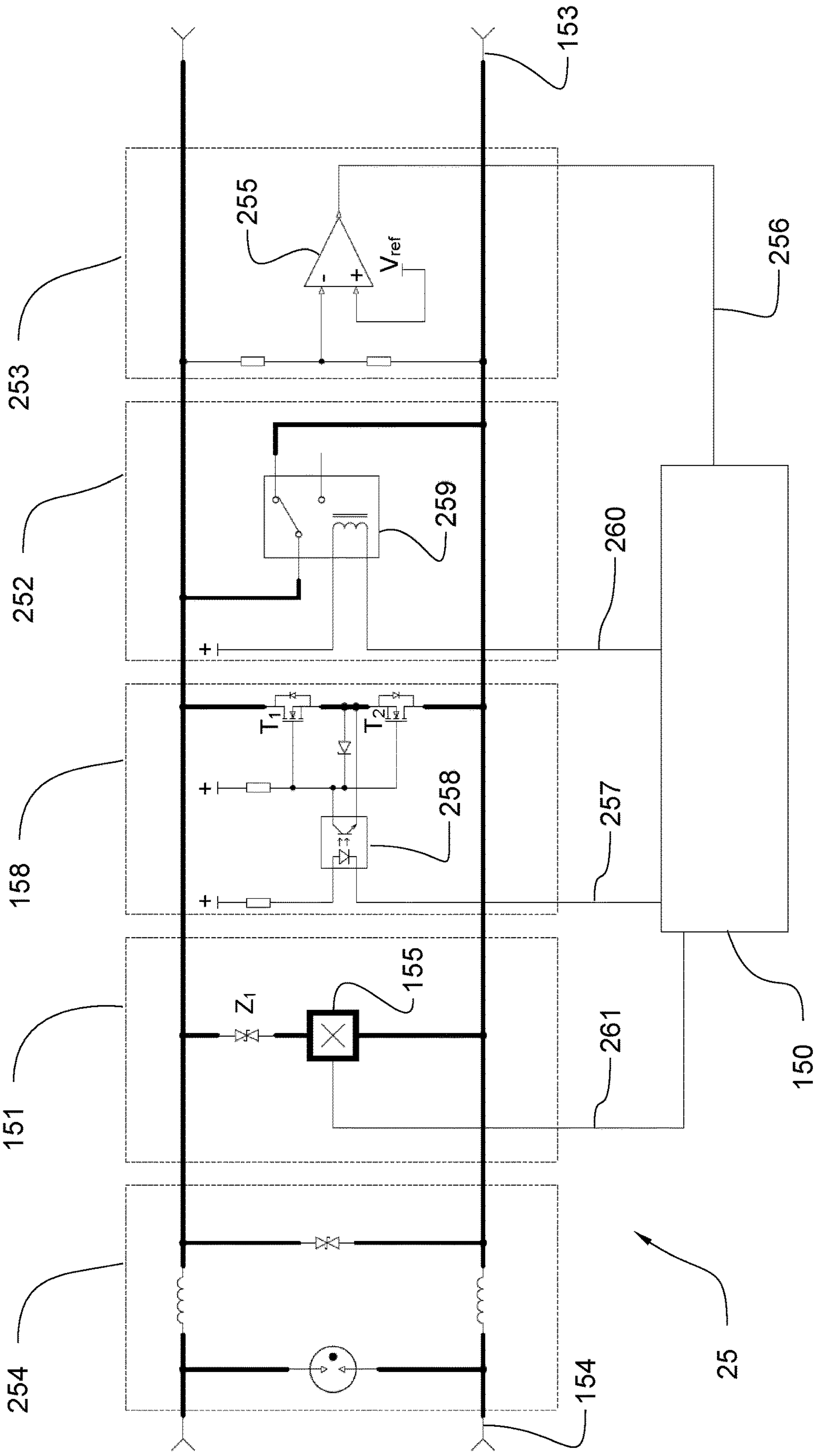
FIG. 4 represents an electrical diagram of another exemplary voltage limiting device according to aspects of the present disclosure.

Referring to FIG. 4, another embodiment of the voltage limiting device 25 has a time delay logic implemented in software, rather than a hardware delay circuit 156 as discussed previously in relation to FIG. 2.

In particular, the voltage limiting device 25 can comprise a control unit 150, a voltage monitoring circuit 253 and a switching circuit 158. The control unit 150 is operably coupled to the voltage monitoring circuit 253 for monitoring when the second threshold voltage $V_2$ is exceeded. Voltage monitoring circuit 253 can comprise voltage comparator logic and provide a voltage feedback signal 256 to the control unit 150. The voltage feedback signal 256 is representative of a voltage level between the input terminals 153 (or between the output terminals 154). In some examples, the voltage monitoring circuit comprises two comparators, one for each polarity of an AC signal provided at the input terminals 153, although in FIG. 4 only one comparator 255 is drawn for clarity of illustration. Control unit 150 is configured to process the voltage feedback signal 256 provided by voltage monitoring circuit 253 to determine whether the second threshold voltage $V_2$ is exceeded. The voltage feedback signal 256 can be an analog signal and the control unit 150 can comprise an analog to digital converter (ADC) to convert the voltage feedback signal to a digital signal for further processing. Alternatively, the voltage monitoring circuit 253 is configured to provide a digital voltage feedback signal.

Control unit 150 further comprises time delay logic, possibly implemented in software or alternatively in hardware, e.g. as an integrated circuit, which acts as a delay circuit similar to the delay circuit 156 of the voltage limiting device 15 of FIG. 2. Specifically, the time delay logic is triggered at a time instant $t_1$ when it is determined that the voltage feedback signal exceeds the second threshold voltage $V_2$. The control unit 150 is further configured to operate the switch circuit 158. By way of example, when the predetermined time period $D_T$ has passed from time instant $t_1$ at which the delay logic was triggered by the voltage monitoring circuit 253, control unit 150 generates a switch control signal 257 for operating switches $T_1$ and $T_2$, in particular to provide the conduction path between the terminals 153 (or 154). Switch circuit 158 can comprise an opto-coupler 258 for providing galvanic isolation between an electric ground of the control unit 150 and an electric ground of switch circuit 158.

The voltage limiting device 25 can comprise a second (redundant) switching circuit 252 acting parallel to the switch circuit 158. Switching circuit 252 comprises a relay 259, rather than a semiconductor switch to provide a short-circuit between the terminals 153 and/or 154. Both the semiconductor switch circuit 158 and the relay of switching circuit 252 can be operated by the control unit 150, e.g. providing a control signal 260 in parallel with control signal 257. Control unit 150 can be configured to trigger the relay of switching circuit 252 somewhat after triggering (operating) switch circuit 158. Relay 259 is advantageously a normal-closed relay for improved reliability. Alternatively, it can be a latching (bistable) relay.

It will be appreciated that the voltage limiting device is advantageously configured to maintain the switch circuit 158 and/or the switching circuit 252 in the short-circuit (closed) condition, i.e., to maintain the conduction path between the terminals 153 and/or between the terminals 154, once triggered by delay circuit 156 and/or control unit 150. The short-circuit condition can be maintained for a second predetermined time period, after which the delay circuit 156 and/or the control unit 150 may be configured to open the switch circuit 158 and, if present, the switching circuit 252. The second predetermined time period is advantageously at least 1 s (1000 ms), advantageously at least 2 s, at least 2.5 s, at least 5 s, at least 10 s or at least 15 s. The second predetermined time period can be between 1 s and 60 s, e.g. about 30 s. The voltage limiting device can hence perform a so-called retry after the second predetermined time period is elapsed to check whether the fault condition that causes the voltage rise still exists. The second predetermined time period is advantageously long enough so that maintenance operators can perform necessary actions.

Advantageously, the voltage limiting device can be equipped with a signalling unit, such as a light indicator, configured to provide an indication on the state of the switch circuit 158 and/or the switching circuit 252, particularly to indicate whether the short-circuit condition is active or not. This provides proper guidance to maintenance operators when effecting maintenance work.

The control unit 150 can be operably coupled to the monitoring circuit 155, e.g. a Hall sensor, for monitoring a condition of the (semiconductor) devices of the voltage clamping circuit 151.

The control unit 150 can be implemented with a test logic configured to test an operating condition of the voltage limiting device 25. Such a test logic can be implemented with voltage limiting device 15 as well. In a first operation, a load is disconnected from the output terminals 154. This causes the voltage across the terminals 154 to rise. In a normal operating condition of the voltage limiting device, when this voltage exceeds $V_2$, this must trigger the voltage monitoring circuit 157/253 and when the voltage exceeds $V_1$ this must trigger the voltage clamping circuit 151. Hence, in a second operation, monitoring circuit 155 will sense a current flowing through the voltage monitoring circuit (Zener diode $Z_1$) which is fed back to the test logic (control unit 150) through feedback signal 261. The test logic can determine whether voltage clamping circuit 151 works correctly based on the feedback signal 261. In a third operation, the test logic can determine whether switch circuit 158 is operating correctly to provide a conduction path between the input terminals 153 and/or between the output terminals 154 within a given time frame, particularly after a time $D_T$ from exceeding $V_2$. This can be sensed by monitoring voltage feedback signal 256, or through any other appropriate circuit. If the test logic senses an abnormal operation of the voltage limiting device, e.g. of the voltage clamping circuit and/or the switching circuit 152, it can take appropriate action to disable the voltage limiting device and short the output terminals 154, e.g. by activating switching circuit 252.

Voltage limiting device 25 can comprise an additional voltage clamping circuit 254 which can be connected parallel to the voltage clamping circuit 151. Voltage clamping circuit 254 advantageously acts as a surge protection to help extend the lifespan of the electronic part.

Advantageously, the voltage limiting devices as described herein allow to meet aspects of IEC standard No. 60479-1 relating to effects of current on human beings and livestock, while providing a simple circuit design based on a two-tier voltage threshold, which improves reliability since it effectively limits the peak voltage and does not comprise any complicated fast switching logic. It furthermore allows to provide and maintain an energy flow towards the load (e.g. signalling device 14) connected to the output terminals 154 during start-up by suitably selecting the time delay $D_T$ of delay circuit 156 (delay logic of control unit 150), avoiding unnecessary switch off of the load. In current state of the art, the capacitors need the energy from the very short spikes to be loaded and this causes several switch off cycles and potentially flickering of the lights. Hence, operation of the constant current circuit is improved.

Due to the voltage clamping circuit 151, there are no high voltage spikes possible. Even though the voltage clamping circuit needs to act fast, this can be obtained with a very simple circuit.

The invention claimed is:

1. A voltage limiting device for constant current circuits, the voltage limiting device, comprising:

input terminals for connecting the voltage limiting device to a current supply of a constant current circuit, output terminals for connecting the voltage limiting device to a load, wherein the voltage limiting device is configured to have the input terminals connected to the output terminals under a normal operating condition, a voltage clamping circuit configured to clamp a voltage across the output terminals to a first voltage threshold, and a switching circuit configured to short-circuit the output terminals, the input terminals, or both the output terminals and the input terminals, when a second voltage threshold across the output terminals is exceeded for a predetermined time period.

2. Device of claim 1, wherein the first voltage threshold is higher than or equal to the second voltage threshold.

3. Device of claim 1, wherein the second voltage threshold is a voltage having one or a combination of: a root mean square value of 50 V or less and a peak value of 71 V or less.

4. Device of claim 1, wherein the switching circuit comprises a delay logic operably coupled to a switch device, the delay logic configured to trigger the switch device at the predetermined time period.

5. Device of claim 4, comprising a voltage detection circuit configured to trigger the delay logic when a voltage across the output terminals exceeds the second voltage threshold.

6. Device of claim 5, wherein the voltage detection circuit is configured to reset the delay logic when the voltage across the output terminals drops below the second voltage threshold.

7. Device of claim 1, wherein the switching circuit comprises a semiconductor switch device and a relay circuit, wherein both the semiconductor switch device and the relay circuit are configured to short-circuit the output terminals and/or the input terminals.

8. Device of claim 7, wherein the switching circuit comprises a control unit operably coupled to the relay circuit and to the semiconductor switch device, wherein the control unit is implemented with a delay logic configured to trigger the semiconductor switch device and the relay circuit.

9. Device of claim 1, further comprising a monitoring circuit configured to test operation of the voltage clamping circuit.

10. Device of claim 9, wherein the monitoring circuit comprises a Hall sensor configured to sense a current through the voltage clamping circuit.

11. Device of claim 1, wherein the predetermined time period is between 50 ms and 2000 ms.

12. The voltage limiting device of claim 1, comprising an auxiliary power supply configured to operate the switching circuit, said auxiliary power supply comprising a transformer.

13. A method of limiting a voltage rise, comprising:
- connecting a current supply to output terminals,
- monitoring a voltage across the output terminals,
- clamping the voltage across the output terminals to a first voltage threshold when the voltage exceeds the first voltage threshold,
- short-circuiting the output terminals when the voltage across the output terminals exceeds a second voltage threshold for a predetermined time period.

14. Method of claim 13, wherein the second voltage threshold is smaller than or equal to the first voltage threshold.

15. Method of claim 13, wherein the predetermined time period is between 50 ms and 2000 ms.

16. A constant current circuit comprising a voltage limiting device, the voltage limiting device comprising:
- input terminals for connecting the voltage limiting device to a current supply of the constant current circuit,
- output terminals for connecting the voltage limiting device to a load of the constant current circuit, wherein the voltage limiting device is configured to have the input terminals connected to the output terminals under a normal operating condition,
- a voltage clamping circuit configured to clamp a voltage across the output terminals to a first voltage threshold, and
- a switching circuit configured to short-circuit the output terminals, the input terminals, or both the output terminals and the input terminals, when a second voltage threshold across the output terminals is exceeded for a predetermined time period.

17. Constant current circuit of claim 16, further comprising one or more LED devices connected at the output terminals of the voltage limiting device.

18. Constant current circuit of claim 16, wherein the constant current circuit is configured to provide an AC current at the output terminals.

19. Constant current circuit of claim 18, further comprising a current supply and a transformer having primary terminals coupled to the power supply and secondary terminals coupled to the load, wherein the voltage limiting device is connected between the secondary terminals and the output terminals.

20. Constant current circuit of claim 19, comprising a plurality of the transformers connected in series, each transformer coupled to a respective voltage limiting device.

21. Isolation transformer for use in a constant current circuit, the isolation transformer comprising a primary side having primary windings and a secondary side having secondary windings and secondary terminals, wherein the isolation transformer further comprises a voltage limiting device, wherein the input terminals of the voltage limiting device are connected to the secondary terminals, wherein the voltage limiting device comprises:
- output terminals for connecting the voltage limiting device to a load of the constant current circuit, wherein the voltage limiting device is configured to have the input terminals connected to the output terminals under a normal operating condition,
- a voltage clamping circuit configured to clamp a voltage across the output terminals to a first voltage threshold, and
- a switching circuit configured to short-circuit the output terminals, the input terminals, or both the output terminals and the input terminals, when a second voltage threshold across the output terminals is exceeded for a predetermined time period.

* * * * *